United States Patent
Kleinfeld et al.

(10) Patent No.: US 11,761,493 B2
(45) Date of Patent: Sep. 19, 2023

(54) CO-MOLDED CVJ BOOT SKIRT FOR ANTI-SLIP PERFORMANCE

(71) Applicant: Steering Solutions IP Holding Corporation, Saginaw, MI (US)

(72) Inventors: Brian J. Kleinfeld, Saginaw, MI (US); Jeffrey P. Courville, Frankenmuth, MI (US); Eduardo R. Mondragon-Parra, Freeland, MI (US); James M. Petrowski, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 400 days.

(21) Appl. No.: 16/927,960

(22) Filed: Jul. 13, 2020

(65) Prior Publication Data

US 2022/0010844 A1  Jan. 13, 2022

(51) Int. Cl.
*F16D 3/84* (2006.01)
*F16J 3/04* (2006.01)
(Continued)

(52) U.S. Cl.
CPC ............ *F16D 3/845* (2013.01); *B29C 45/006* (2013.01); *B29C 49/0031* (2013.01); *B29C 65/7805* (2013.01); *F16J 3/041* (2013.01); B29K 2021/003 (2013.01); B29K 2105/0005 (2013.01); B29L 2031/75 (2013.01); F16D 2200/0056 (2013.01);
(Continued)

(58) Field of Classification Search
CPC ............. F16D 3/845; F16D 2200/0056; F16D 2200/0086; F16D 2250/0061; F16D 2300/06; B29C 45/006; B29C 49/0031; B29C 65/7805; F16J 3/041; B29K 2021/003; B29K 2105/0005; B29L 2031/75; Y10S 464/906
USPC ........................................................ 464/175
See application file for complete search history.

(56) References Cited

U.S. PATENT DOCUMENTS 5,026,323 A * 6/1991 Fukumura ............... F16D 3/845
                                                    464/175
5,836,824 A * 11/1998 Konegen .................. F16J 3/042
                                                    464/175
(Continued)

OTHER PUBLICATIONS

Engineers Edge, retrieved from the internet Nov. 28, 2022, <www.engineersedge.com>. (Year: 2000).*
(Continued)

*Primary Examiner* — Greg Binda
(74) *Attorney, Agent, or Firm* — Dickinson Wright PLLC (57) ABSTRACT

A boot for a shaft assembly joint and method of construction thereof are provided. The boot has a flexible hollow wall extending about a central axis between a first end and a second end. The first end has a skirt portion configured for snug engagement with an outer surface of a housing of the constant velocity joint and the second end has a neck portion configured for snug engagement with an outer surface of a shaft extending away from the constant velocity joint. At least one of the skirt portion and the neck portion has interior surface formed of a first material having a first coefficient of friction and an exterior surface formed of a second material having a second coefficient of friction, the first coefficient of friction being greater than the second coefficient of friction.

15 Claims, 4 Drawing Sheets

(51) Int. Cl.
  *B29C 49/00* (2006.01)
  *B29C 45/00* (2006.01)
  *B29C 65/78* (2006.01)
  *B29K 105/00* (2006.01)
  *B29K 21/00* (2006.01)
  *B29L 31/00* (2006.01)

(52) U.S. Cl.
  CPC ............... *F16D 2200/0086* (2013.01); *F16D 2250/0061* (2013.01); *F16D 2300/06* (2013.01); *Y10S 464/906* (2013.01)

(56) References Cited

U.S. PATENT DOCUMENTS

| | | | |
|---|---|---|---|
| 7,384,673 B2 * | 6/2008 | Konegen | F16D 3/845 464/145 |
| 8,783,953 B2 * | 7/2014 | Voisine | F16J 15/3284 277/635 |

OTHER PUBLICATIONS

Science Direct, retrieved from the internet Nov. 29, 2022, <www.sciencedirect.com>. (Year: 2022).*

Jehbco, retrieved from the internet Nov. 29, 2022, <jehbco.com.au>. (Year: 2017).*

* cited by examiner

FIG. 7 ic # CO-MOLDED CVJ BOOT SKIRT FOR ANTI-SLIP PERFORMANCE

FIELD OF THE INVENTION

The present disclosure generally relates to shaft assemblies for motor vehicles, and more specifically, to shaft assemblies having boots for shielding external contaminants and retaining lubricant within joints of the shaft assemblies.

BACKGROUND OF THE INVENTION

Automotive shaft joint boot applications, such as constant-velocity joint (CVJ) boot applications, were typically made of rubber and lacked the flex fatigue and contaminant resistance. Constant-velocity joints allow a rotating shaft to transmit power from the transmission to the wheels, and the boots protect that critical component from external contaminants, while keeping lubricants inside. Any cracks or tears in the boot can lead to premature CV joint failure. Accordingly, more durable materials were sought.

Thermoplastic elastomers (TPE) have since replaced rubber for use in CVJ boot applications, whereupon the durability has been more than doubled, in part due to enhanced flexibility and abrasion resistance. As such, boot material failures have been greatly reduced, and smaller, more compact, less costly boots have been made available.

The enhanced flexibility and abrasion resistance provided by the TPE boots is owed largely to the inclusion of lubricant additives in the isotropic TPE material used to form the boots. The lubricant additives, in addition to enhancing the flexibility and abrasion resistance, reduces the noise generation from material of adjacent convolutes coming into rubbing contact while the boot is flexed as the joint is bent. The boots are typically molded as an isotropic component from the isotropic TPE material, thereby having uniform physical properties throughout the entirety of the boot. Although having enhanced flexibility and abrasion resistance throughout the entirety of the boot has proven beneficial, some potential drawbacks have received notice.

At least one end of a CVJ boot is commonly fixed about an outer surface of a metal CVJ housing. The end of the boot fixed to the housing is commonly referred to as a skirt, wherein the skirt is often sandwiched between an outer surface of the housing and a fastener, such as an annular hose clamp that can be constricted about the skirt to compress the skirt into fixed relation against the housing. Unfortunately, the lubricant additive within the TPE makes an inner surface of the skirt lubricious (slippery), and thus, the inner surface, although clamped against the outer surface of the housing, is able to slide relative to the outer surface of the housing. As such, as the boot experiences forces imparted by flexing in use, the inner surface can undesirably move out of clamped relation with the housing, thereby destroying the protection and lubricant retention provided by the boot to the underlying CV joint.

SUMMARY OF THE INVENTION

It is an object of the present disclosure to provide a boot for shielding and retaining lubricant within joints of the shaft assemblies that overcomes at least some of the drawbacks discussed above with known boots.

It is a further object of the present disclosure to provide a boot that is robust and durable in use, and economical in manufacture and assembly.

It is a further object of the present disclosure to provide a boot having a skirt portion configured to be fixed in engagement with a housing of a joint member, wherein the skirt portion resists sliding relative to the housing so as to remain fixed thereto, while providing a remaining portion of the boot that both flexible and durable to provide the boot with a long and useful life.

According to the objects and advantages, an aspect of the present disclosure provides a boot for a shaft assembly joint including a flexible tubular wall extending between a first end and a second end along a central axis. The first end is configured for receipt about a housing of the shaft assembly joint and the second end is configured for receipt about a shaft extending from the shaft assembly joint. The first end provides a skirt portion with a thickness extending from an annular interior surface facing toward the central axis, for fixed engagement with an outer surface of the housing, to an annular exterior surface facing away from the central axis. The thickness of the skirt portion is provided being anisotropic to provide the interior surface having an increased coefficient of friction relative to the exterior surface to facilitate maintaining the skirt portion in fixed engagement with the outer surface of the housing.

In accordance with another aspect of the disclosure, the interior surface can be formed of a first material and the exterior surface can be formed of a second material, with the first material being different from the second material to provide the desired, different material properties at the interior surface and the exterior surface.

In accordance with another aspect of the disclosure, the first material can be configured to form an annular inner portion of the skirt portion and the second material can be configured to form an annular outer portion of the skirt portion, with the annular inner portion and the annular outer portion being bonded in fixed relation to one another.

In accordance with another aspect of the disclosure, the annular outer portion can be configured having an annular channel configured for receipt of a clamp band.

In accordance with another aspect of the disclosure, the annular inner portion can be formed having a thickness between about 12.5 to 75 percent of the thickness of the annular outer portion.

In accordance with another aspect of the disclosure, the annular inner portion can be configured having an annular rib extending radially inwardly from the interior surface with the radially inwardly extending annular rib being configured for receipt in an annular groove in the outer surface of the housing to enhance retention of the skirt portion on the outer surface of the housing.

In accordance with another aspect of the disclosure, the flexible tubular wall is formed of the second material, such that the second material forms the entirety of the boot, other than the annular inner portion formed by the first material.

In accordance with another aspect of the disclosure, the first material is provided having a first coefficient of friction and the second material is provided having a second coefficient of friction, with the first coefficient of friction being greater than the second coefficient of friction, thus, enhancing fixation of the skirt portion to the outer surface of the housing.

In accordance with another aspect of the disclosure, the second material can be provided as an isotropic thermoplastic elastomeric material including a lubricant additive, thereby rendering the boot being flexible, crack resistant, strong and durable.

In accordance with another aspect of the disclosure, the first material can be provided not including a lubricant additive, thereby increasing its coefficient of friction relative to a material having a lubricant additive, thus, enhancing the ability of the skirt portion to remain fixed against movement relative to the outer surface of the housing.

In accordance with another aspect of the disclosure, the first material can be provided as a non-lubricous material, such as a thermoplastic elastomeric material devoid of a lubricant additive.

In accordance with another aspect of the disclosure, a boot for a constant velocity joint includes a flexible hollow wall extending about a central axis between a first end and a second end. The first end has a skirt portion configured for snug engagement with an outer surface of a housing of the constant velocity joint and the second end has a neck portion configured for snug engagement with an outer surface of a shaft extending from the constant velocity joint. At least one of the skirt portion and the neck portion has interior surface formed of a first material having a first coefficient of friction and an exterior surface formed of a second material having a second coefficient of friction, with the first coefficient of friction being greater than the second coefficient of friction to inhibit slip between the interior surface and the surface being engaged.

In accordance with another aspect of the disclosure, the first material can be formed to provide an annular inner portion of at least one of the skirt portion and the neck portion, and the second material can be formed to provide an annular outer portion of at least one of the skirt portion and the neck portion, such that the annular inner portion has a thickness between about 12.5 to 75 percent of the thickness of the annular outer portion.

In accordance with another aspect of the disclosure, a boot for a constant velocity joint is provided having a flexible hollow wall extending about a central axis between a first end and a second end. The second end is configured for snug receipt about a shaft extending away from the constant velocity joint. The first end has a skirt portion with an annular exterior surface facing away from the central axis and an annular interior surface facing toward the central axis for snug engagement with an outer surface of a housing of the constant velocity joint. The interior surface of the skirt portion is formed of a first material having a first coefficient of friction and the second end is formed of a second material having a second coefficient of friction, wherein the first coefficient of friction is greater than the second coefficient of friction to facilitate maintaining the skirt portion in fixed engagement with the outer surface of the housing.

In accordance with another aspect of the disclosure, the first material can be formed to provide an annular inner portion of the skirt portion and the second material can be formed to provide an annular outer portion of the skirt portion, such that the inner and outer portions are concentric, wherein the annular inner portion and the annular outer portion are bonded in fixed relation to one another.

In accordance with another aspect of the disclosure, the entirety of the flexible hollow wall, other than the annular inner portion of the skirt portion, is formed of the second material, thereby increasing the flexibility and durability of the boot, while also enhancing the economy of manufacture.

In accordance with another aspect of the disclosure, the second material can be provided having a lubricant additive to enhance the flexibility, durability and crack resistance of the wall and the first material can be provided being free of a lubricant additive to increase the coefficient of friction, thereby providing the annular inner portion being slip resistant relative to the outer surface of the housing.

In accordance with another aspect of the disclosure, a method of constructing a boot for a constant velocity joint is provided. The method includes: molding a flexible hollow wall with a second material extending about a central axis between a first end and a second end, with the first end being molded forming at least part of a skirt portion configured for snug engagement with an outer surface of a housing of the constant velocity joint, and the second end being molded forming at least part of a neck portion configured for snug engagement with an outer surface of a shaft extending away from the constant velocity joint; and bonding an annular inner portion, having an interior surface formed of a first material, to an inner surface of at least one of the skirt portion and the neck portion, the interior surface facing toward the central axis and being configured for snug engagement with the outer surface of at least one of the housing and the shaft, wherein the first material is provided having a first coefficient of friction and the second material is provided having a second coefficient of friction, the first coefficient of friction being greater than the second coefficient of friction.

In accordance with another aspect of the disclosure, another method of constructing a boot for a constant velocity joint is provided. The method includes: molding a flexible hollow wall with a second material extending about a central axis between a first end and a second end, with the second end being molded for snug receipt about a shaft extending away from the constant velocity joint and the first end being molded supporting a skirt portion having an annular outer portion with an exterior surface facing away from the central axis. Further, bonding an annular inner portion, having an interior surface formed of a first material, to the annular outer portion of the skirt portion, with the interior surface facing toward the central axis and being configured for snug engagement with an outer surface of a housing of the constant velocity joint. Further yet, providing the first material having a first coefficient of friction and providing the second material having a second coefficient of friction, with the first coefficient of friction being greater than the second coefficient of friction to inhibit relative sliding movement between the interior surface of the annular inner portion and the outer surface of the housing.

In accordance with another aspect of the disclosure, the method can further include bonding the annular inner portion to the annular outer portion by molding the first material of the annular inner portion directly on the second material of the annular outer portion.

In accordance with another aspect of the disclosure, the method can further include providing the second material as an isotropic thermoplastic elastomeric material including a lubricant additive to increase the flexibility, crack resistance and durability of the boot.

In accordance with another aspect of the disclosure, the method can further include providing the first material as an isotropic thermoplastic elastomeric material not including a lubricant additive to increase the static friction between the interior surface of the skirt portion and the outer surface of the housing, thereby minimizing the potential for relative sliding movement between the interior surface of the skirt portion and the outer surface of the housing.

In accordance with another aspect of the disclosure, the method can further include molding the annular inner portion having an annular rib extending radially inwardly from the interior surface, with the annular rib being configured for receipt in an annular groove in the outer surface of the housing.

In accordance with another aspect of the disclosure, the method can further include molding the annular outer portion having an annular channel configured for receipt of a clamp band.

These and other objects, advantages and features will become readily apparent to one possessing ordinary skill in the art in view of the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figures 1, 2, 3:
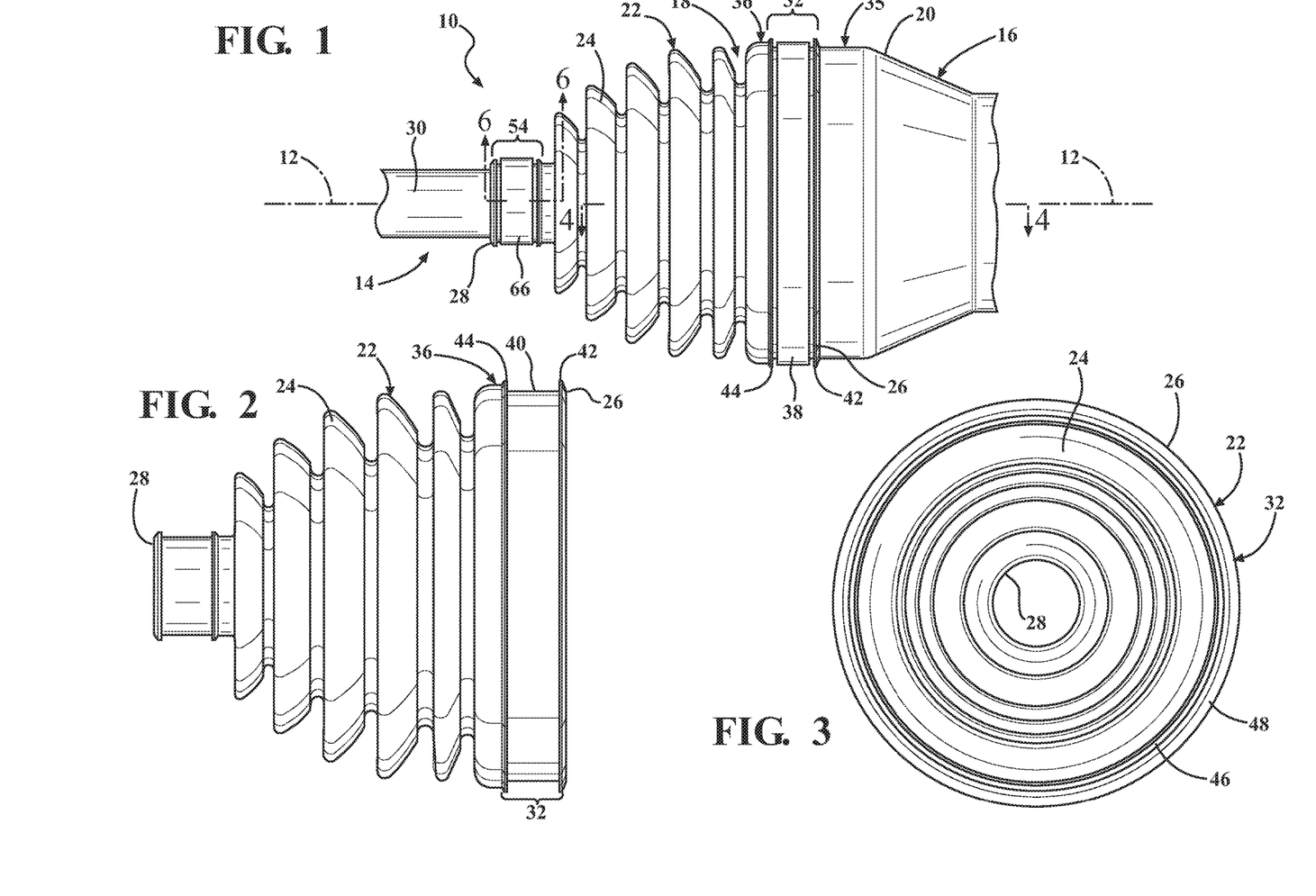
FIG. 1 is a side view of a shaft system having a flexible joint with a joint boot constructed in accordance with one aspect of the invention.
FIG. 2 is a side view of the joint boot of FIG. 1.
FIG. 3 is an end view of the joint boot of FIG. 1 looking generally in the direction of arrow 3 of FIG. 2.

Referring now to the Figures, where the invention will be described with reference to specific embodiments, without limiting same, FIG. 1 illustrates an exemplary side view of a shaft system 10 that extends along and is rotatable about a central axis 12. The shaft system 10 includes a shaft assembly 14, a flexible shaft joint, such as a constant velocity joint 16, by way of example and without limitation, and a joint boot assembly, shown as a constant velocity joint boot assembly 18. The boot assembly 18, although described with reference to a constant velocity joint, could be used for flexible shaft joints other than constant velocity joints, such a universal joints (UV joints) or otherwise.

The shaft assembly 14 is arranged to rotate about the axis 12. The shaft assembly 14 may include a first shaft that is operatively connected to a second shaft by the shaft joint 16. One of the first shaft or the second shaft, in a non-limiting example, can be connected to a source of rotation, such as a transmission output shaft, while the other shaft can be connected to a rotatable member such as a wheel, wheel hub, or the like.

Figure 4:
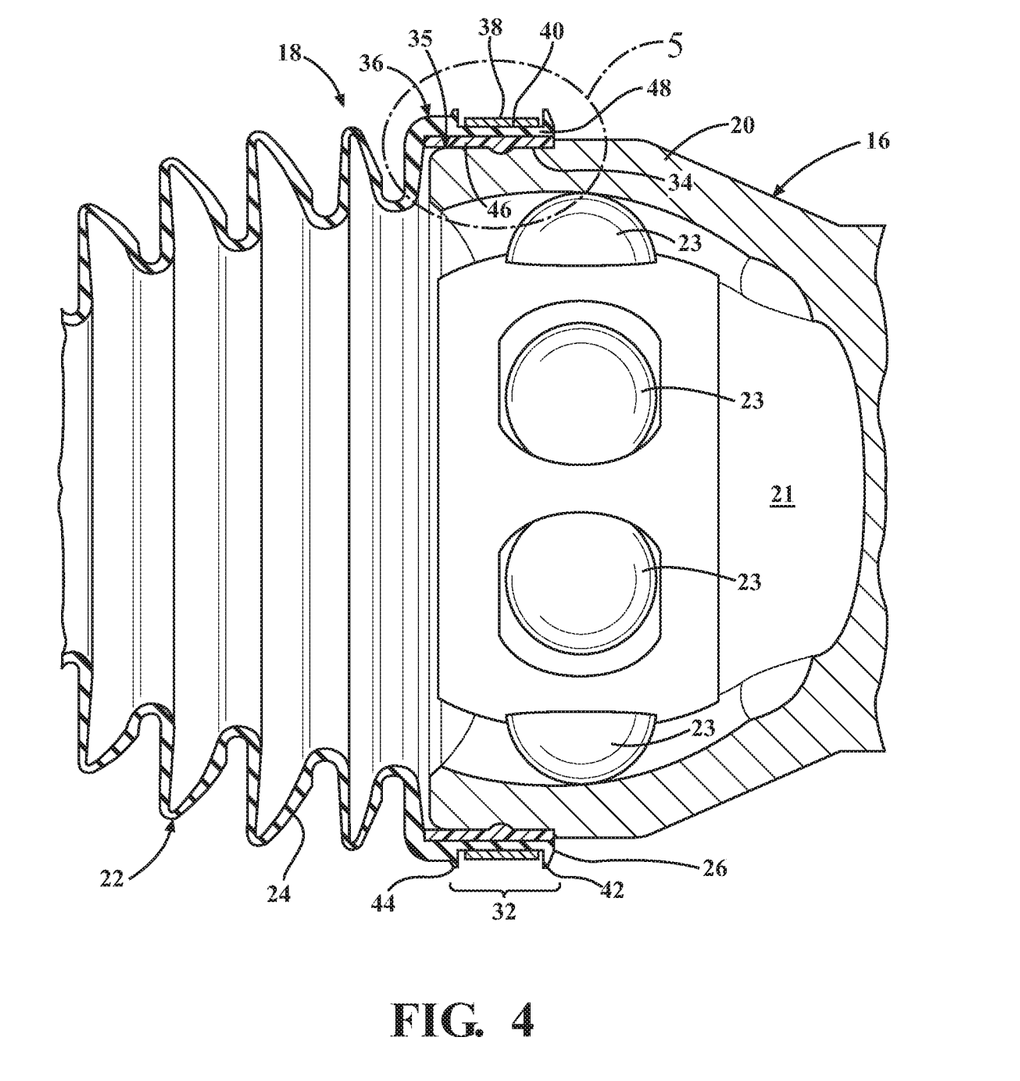
FIG. 4 is a cross-sectional view of the flexible joint of FIG. 1 taken generally along section 4-4 of FIG. 1.

The constant velocity joint 16 is disposed at or about an intersection between the first shaft and the second shaft of the shaft assembly 14. The constant velocity joint 16 is configured to facilitate the rotation, articulation, angulation, and/or plunging of the first shaft relative to the second shaft. The constant velocity joint 16 includes an outer member, referred to as housing 20, that is operatively connected to an inner member 21 and at least one of the first shaft or the second shaft of the shaft assembly 14. A plurality of rolling elements 23 are disposed between the housing 20 and the inner member 21 to facilitate low friction movement therebetween.

The constant velocity joint boot assembly 18 is disposed about at least a portion of the housing 20 of the constant velocity joint 16 and about a portion of the shaft assembly 14 extending from the constant velocity joint 16. The constant velocity joint boot assembly 18 is arranged to retain a lubricant, such as grease, within the constant velocity joint 16 and to inhibit the ingress of outside contaminants, such as dirt, stones, water and the like, into the constant velocity joint 16.

Figure 5:
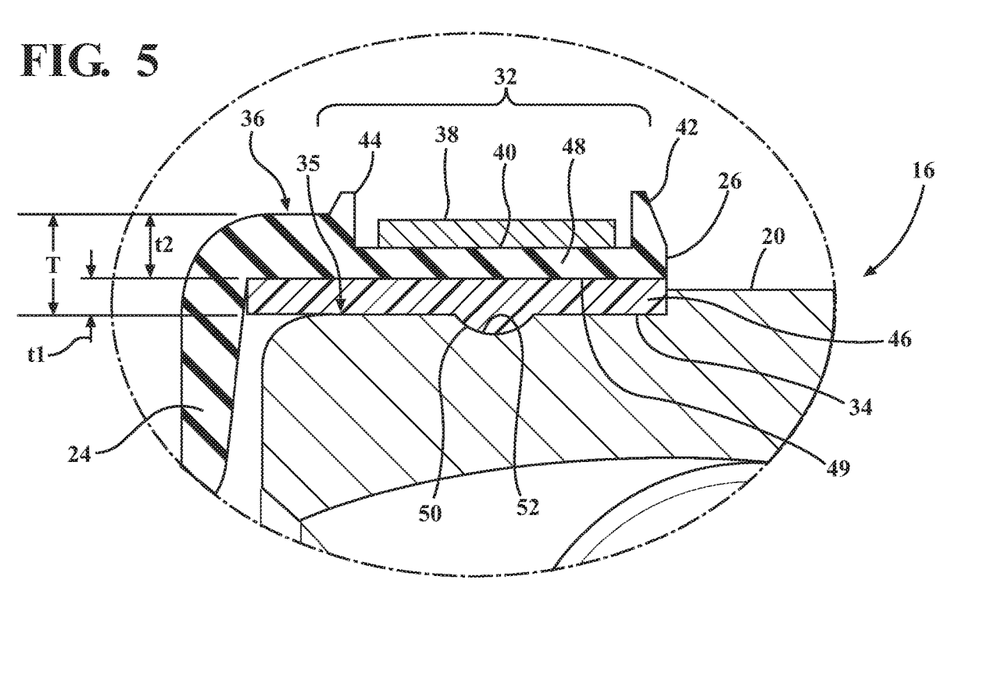
FIG. 5 is an enlarged view of the encircled area 5 of FIG. 4.

The constant velocity joint boot assembly 18 includes a boot 22, also referred to as constant velocity joint boot, joint boot or the like, having a flexible, hollow tubular wall 24 extending between an open large end, also referred to as first end 26, and an open small end, also referred to as second end 28, along the central axis 12. The first end 26 is configured for receipt about the housing 20 of the shaft assembly joint 16 and the second end 28 is configured for receipt about a shaft 30 extending from the shaft assembly joint 16. The first end 26 is provided having a skirt portion 32 with a thickness (T; FIG. 5) extending from an annular interior surface 34, facing toward the central axis 12 for fixed engagement with an outer surface 35 of the housing 20, to an annular exterior surface 36 facing away from the central axis 12. The thickness T of the skirt portion 32 is provided being anisotropic, thus, having different material properties across the thickness T, to provide the interior surface 34 having an increased coefficient of friction relative to the exterior surface 36. The increased coefficient of friction of the interior surface 34 facilitates maintaining the skirt portion 32 in fixed engagement with the outer surface 35 of the joint housing 20 over the useful life of the joint 16. As such, optimal protection against the ingress of contaminants into the joint 16 and retention of lubrication within the joint 16 is provided, thereby optimizing the useful life of the joint 16.

The tubular wall 24 may have a varying cross-sectional diameter or a varying cross-sectional form extending between the first end 26 and the second end 28. The wall 24 is illustrated having a smooth, undulating corrugated contour, but may be configured otherwise, such as being conical or cylindrical, or the like that enables the boot 22 to be flexible.

The skirt portion 32 is configured to be fixed in sealed relation against the outer surface 35 of the housing 20, such as by a mechanical fastener, shown as an adjustable clamp 38, also referred to as hose clamp or clamp band, by way of example and without limitation. To facilitate locating and retaining the clamp band 38 on the skirt portion 38, the exterior surface 36 of the skirt portion 32 can be formed having an annular channel 40 configured for receipt of a band clamp 38. With the band clamp 38 fixed in the annular channel 40, an annular lip 42 and an opposite annular raised shoulder 44 of the skirt portion 32, both extending radially outwardly from the exterior surface 36, retain the band clamp 38 against axial movement along the exterior surface 36 of the skirt portion 32.

The anisotropic property of the skirt portion 32 is established by a first material forming the interior surface 34 and a second material forming the exterior surface 36, wherein the first material is different from the second material. As best shown in FIG. 5, the first material forms an annular inner portion 46 of the skirt portion 32 and the second material forms an annular outer portion 48 of the skirt portion 46. The annular inner portion 46 and the annular outer portion 48 are concentrically arranged in radially aligned relation with one another, and are shown as being bonded directly to one another, with the inner portion 46 being bonded to an inner surface 49 of the outer portion 48. The annular inner portion 46 can be formed having a first thickness t1 and the annular outer portion 48 can be formed having a second thickness t2, wherein the combined thickness of the first and second thicknesses (t1+t2) forms the total thickness T of the skirt portion 32. The first thickness t1 of the annular inner portion 46 can be formed having a thickness between about 12.5 to 75 percent of the thickness t2 of the annular outer portion 48. In one non-limiting embodiment, the first thickness t1 was formed having a thickness of about 1.0 mm, while the second thickness t2 was formed having a thickness of about 1.3 mm. The thickness t1 can be provided between about 0.5 mm to 3.0 mm and the thickness t2 can be provided between about 1.3 mm to 4.0 mm.

The non-lubricious first material forming the annular inner portion 46 has a first coefficient of friction and the lubricious second material forming the annular outer portion 48 has a second coefficient of friction, wherein the first coefficient of friction is greater than the second coefficient of friction. The relative increase in the coefficient of friction of the annular inner portion 46 facilitates inhibiting slip between the skirt portion 32 and the outer surface 35 of the housing 20.

The second material forming the annular outer portion 48 can be provided as a material including a lubricant additive, thereby lending to its being lubricious, and can be formed as a monolithic piece of the same material along with the remaining portion of the boot 22, other than the annular inner portion 46. Accordingly, the wall 24 and the annular outer portion 48 can be formed of an isotropic material, such a thermoplastic elastomeric material (TPE) having a lubricant additive to enhance the flexibility, crack resistance, durability and strength of the boot 22.

The first material forming the annular inner portion 46 is provided not including a lubricant additive, thereby being non-lubricious, and thus, having an increased coefficient of friction relative to the annular outer portion 48. In a non-limiting example, the first material is a lubricant free, isotropic thermoplastic elastomeric material (TPE).

As a backup to inhibiting slip between the skirt portion 32 and the outer surface 35 of the housing 20, as best shown in FIG. 5, the annular inner portion 46 can be formed having an annular rib 50 extending radially inwardly from the interior surface 34, with the annular rib 50 being configured for receipt in an annular groove 52 formed in the outer surface 35 of the housing 20.

Figure 6:
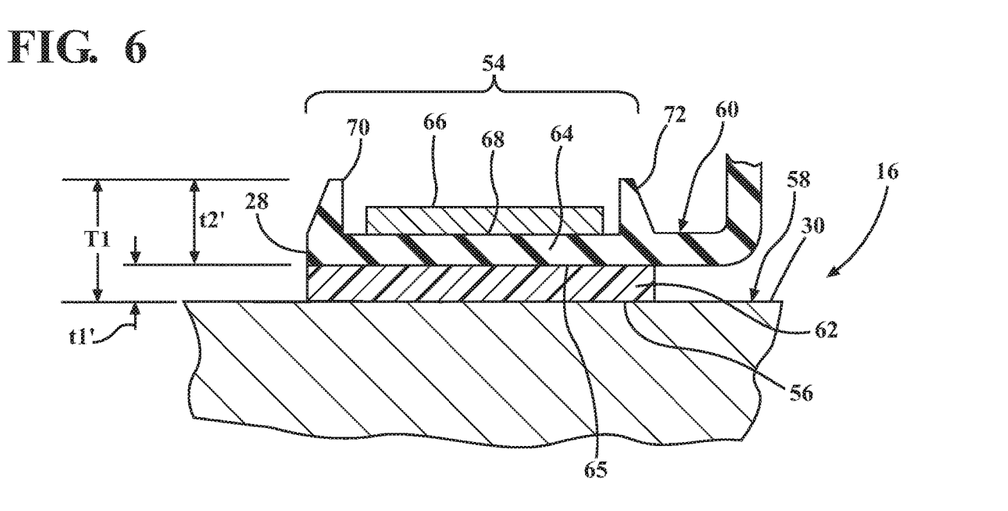
FIG. 6 is an enlarged cross-sectional view of the flexible joint of FIG. 1 taken generally along section 6-6 of FIG. 1.

The second end 28 is provided having a neck portion 54 with a thickness (T1; FIG. 6) extending from an annular interior surface 56, facing toward the central axis 12 for fixed engagement with an outer surface 58 of the shaft 30, to an annular exterior surface 60 facing away from the central axis 12. The thickness T1 of the neck portion 54 can be provided being anisotropic, as described for the skirt portion 32, to provide the interior surface 56 having an increased coefficient of friction relative to the exterior surface 60. The increased coefficient of friction of the interior surface 56 facilitates maintaining the neck portion 54 in fixed engagement with the outer surface 58 of the shaft 30 over the useful life of the joint 16. As such, assurance of maintaining the neck portion 54 in fixed relation against axial movement relative to the shaft 30 is provided, thereby further facilitating maintaining the skirt portion 32 in its desired axially fixed relation on the outer surface 35 of the housing 20 is provided, thereby optimizing the useful life of the joint 16.

The anisotropic property of the neck portion 54 is established by a first material forming the interior surface 56 and a second material forming the exterior surface 60, wherein the first material is different from the second material, as discussed above for the skirt portion 32. As best shown in FIG. 6, the first material forms an annular inner portion 62 and the second material forms an annular outer portion 64. The annular inner portion 62 and the annular outer portion 64 are concentrically arranged in radially aligned relation with one another, and are shown as being bonded directly to one another with the inner portion 62 being bonded to an inner surface 65 of the outer portion 64. The annular inner portion 62 can be formed having a first thickness t1' and the annular outer portion 64 can be formed having a second thickness t2', wherein the combined thickness of the first and second thicknesses (t1'+t2') forms the total thickness T1 of the neck portion 54. The first thickness t1' of the annular inner portion can be formed having a thickness between about 12.5 to 75 percent of the thickness t2' of the annular outer portion. In one non-limiting embodiment, the first thickness t1' was formed having a thickness of about 1.0 mm, while the second thickness t2' was formed having a thickness of about 2.5 mm. The thickness t1' can be provided between about 0.5 mm to 3.0 mm and the thickness t2' can be provided between about 1.0 mm to 2.5 mm.

The first material forming the annular inner portion 62 has a first coefficient of friction and the second material forming the annular outer portion 64 has a second coefficient of friction, wherein the first coefficient of friction is greater than the second coefficient of friction. The first material forming the annular inner portion 62 and the second material forming the annular outer portion 64 has a second coefficient of friction are provided and formed as discussed for the annular inner portion 46 and the annular outer portion 48 for the skirt portion 32, and thus further discussion is believed unnecessary.

The neck portion 54 is configured to be fixed in sealed relation against the outer surface 58 of the shaft 30, such as by a mechanical fastener, shown as an adjustable clamp 66, as discussed above for the skirt portion 38 and the band clamp 38. As such, the exterior surface 60 of the neck portion 54 can be formed having an annular channel 68 configured for receipt of the clamp 66. With the clamp 66 fixed in the annular channel 68, an annular lip 70 and an opposite annular raised shoulder 72 of the neck portion 54, both extending radially outwardly from the exterior surface 60, retain the clamp 66 against axial movement along the exterior surface 60 of the neck portion 54.

Figure 7:
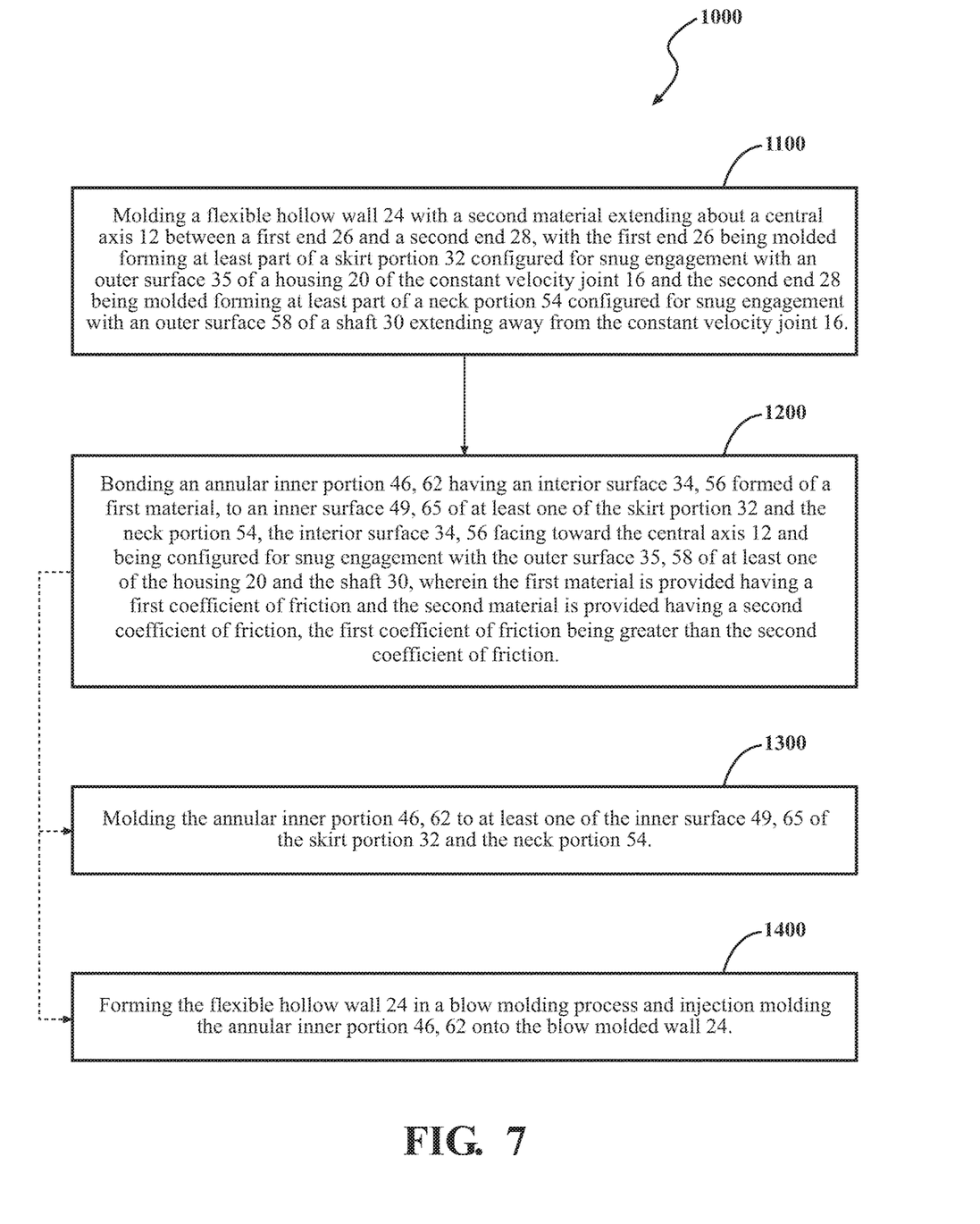
FIG. 7 is a flow diagram illustrating a method of constructing a joint boot in accordance with an aspect of the disclosure.

In accordance with a further aspect of the disclosure, a method 1000 of constructing the boot 22 for providing protection to a shaft joint, such as a constant velocity joint 16, is provided. The method 1000 includes a step 1100 of molding a flexible hollow wall 24 with a second material extending about a central axis 12 between a first end 26 and a second end 28, with the first end 26 being molded forming at least part of a skirt portion 32 configured for snug engagement with an outer surface 35 of a housing 20 of the constant velocity joint 16 and the second end 28 being molded forming at least part of a neck portion 54 configured for snug engagement with an outer surface 58 of a shaft 30 extending away from the constant velocity joint 16. Further, a step 1200 of bonding an annular inner portion 46, 62 having an interior surface 34, 56 formed of a first material, to an inner surface 49, 65 of at least one of the skirt portion 32 and the neck portion 54, the interior surface 34, 56 facing toward the central axis 12 and being configured for snug engagement with the outer surface 35, 58 of at least one of the housing 20 and the shaft 30, wherein the first material is provided having a first coefficient of friction and the second material is provided having a second coefficient of friction, the first coefficient of friction being greater than the second coefficient of friction.

The method 1000 can further include a step 1300 of molding the annular inner portion 46, 62 to at least one of the inner surface 49, 65 of the skirt portion 32 and the neck portion 54.

The method 1000 can further include a step 1400 of using a blow molding process to form the flexible hollow wall 24 and an injection molding process to form the annular inner portion 46, 62, with the annular inner portion 46, 62 being injected onto the already blow molded wall 24.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Individual elements or features of a particular embodiment are generally not limited to that particular embodiment, but, where applicable, are interchangeable and can be used in a selected embodiment, even if not specifically shown or described. Accordingly, the invention is not to be seen as limited by the foregoing description.

Having thus described the invention, it is claimed:

1. A boot for a shaft assembly joint, comprising:
a flexible tubular wall extending between a first end and a second end along a central axis, the first end being configured for receipt about a housing of the shaft assembly joint and the second end being configured for receipt about a shaft extending from the shaft assembly joint, the first end having a skirt portion with a thickness extending from an annular interior surface, facing toward the central axis for fixed engagement with an outer surface of the housing, to an annular exterior surface facing away from the central axis, with the thickness of the skirt portion being defined by a combined thickness of an annular inner portion of a first material and an annular outer portion of a second material, with the annular inner portion providing the interior surface having an increased coefficient of friction relative to the exterior surface to facilitate maintaining the skirt portion in fixed engagement with the outer surface of the housing, wherein the annular inner portion has a radially outwardly facing outer surface bonded to a radially inwardly facing surface of the annular outer portion.

2. The boot of claim 1, wherein the first material is different from the second material.

3. The boot of claim 2, wherein the flexible tubular wall is formed of the second material.

4. The boot of claim 2, wherein the first material has a first coefficient of friction and the second material has a second coefficient of friction, the first coefficient of friction being greater than the second coefficient of friction.

5. The boot of claim 4, wherein the second material is an isotropic thermoplastic elastomeric material including a lubricant additive, and wherein the first material does not include a lubricant additive.

6. The boot of claim 1, wherein the annular outer portion has an annular channel configured for receipt of a clamp band.

7. The boot of claim 1, wherein the annular inner portion has an annular rib extending radially inwardly from the interior surface with the annular rib being configured for receipt in an annular groove in the outer surface of the housing.

8. The boot of claim 1, wherein the second end provides a neck portion with a thickness extending from an annular interior surface, facing toward the central axis for fixed engagement with an outer surface of the shaft, to an annular exterior surface facing away from the central axis, wherein the interior surface of the neck portion is formed of a first material and the exterior surface of the neck portion is formed of a second material, the first material being different from the second material.

9. The boot of claim 8, wherein the first material of the neck portion forms an annular inner portion of the neck portion and the second material of the neck portion forms an annular outer portion of the neck portion, the annular inner portion of the neck portion having a first coefficient of friction and the annular outer portion of the neck portion having a second coefficient of friction, the first coefficient of friction being greater than the second coefficient of friction.

10. The boot of claim 1, wherein the annular inner portion and the annular outer portion are molded to one another.

11. The boot of claim 10, wherein the annular inner portion is injection molded on the radially inwardly facing surface of annular outer portion.

12. A boot for a constant velocity joint, comprising:
a flexible hollow wall extending about a central axis between a first end and a second end, the first end having a skirt portion configured for snug engagement with an outer surface of a housing of the constant velocity joint and the second end having a neck portion configured for snug engagement with an outer surface of a shaft extending away from the constant velocity joint, at least one of the skirt portion and the neck portion having interior surface formed of an inner material having a first coefficient of friction and an exterior surface formed of an outer material having a second coefficient of friction, the first coefficient of friction being greater than the second coefficient of friction, wherein the inner material forms an annular inner portion of at least one of the skirt portion and the neck portion and the outer material forms an annular outer portion of at least one of the skirt portion and the neck portion, the annular inner portion has a radially outwardly facing outer surface bonded to a radially inwardly facing surface of the annular outer portion.

13. The boot of claim 12, wherein the inner material forms an annular inner portion of the skirt portion and the neck portion and the outer material forms an annular outer portion of the skirt portion and the neck portion.

14. The boot of claim 12, wherein the annular inner portion and the annular outer portion are molded to one another.

15. The boot of claim 14, wherein the annular inner portion is injection molded on the radially inwardly facing surface of annular outer portion.

* * * * *